US010598531B2

(12) United States Patent
Lang et al.

(10) Patent No.: US 10,598,531 B2
(45) Date of Patent: Mar. 24, 2020

(54) CORIOLIS FLOW METER WITH MULTIPLE ACTUATORS ARRANGED ON A FLOW TUBE AND DRIVEN IN DIFFERENT PLANES

(71) Applicant: General Electric Company, Schenectady, NY (US)

(72) Inventors: Philipp Lang, Bad Waldsee (DE); Jens Ruetten, Garching (DE); Charles Erklin Seeley, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 38 days.

(21) Appl. No.: 15/960,296

(22) Filed: Apr. 23, 2018

(65) Prior Publication Data

US 2019/0323872 A1   Oct. 24, 2019

(51) Int. Cl.
*G01F 1/84* (2006.01)
*G01F 15/00* (2006.01)
*G01F 25/00* (2006.01)

(52) U.S. Cl.
CPC ............ *G01F 1/8436* (2013.01); *G01F 1/849* (2013.01); *G01F 1/8413* (2013.01); *G01F 15/006* (2013.01); *G01F 25/0007* (2013.01)

(58) Field of Classification Search
None
See application file for complete search history.

(56) References Cited

U.S. PATENT DOCUMENTS

| | | | |
|---|---|---|---|
| 5,448,921 A | 9/1995 | Cage et al. | |
| 6,041,665 A | 3/2000 | Hussain | |
| 6,606,573 B2* | 8/2003 | Wheeler | G01F 1/8436 702/100 |
| 6,684,715 B1* | 2/2004 | Cage | G01F 1/8427 73/861.357 |
| 6,805,013 B2 | 10/2004 | Amabili et al. | |
| 7,136,777 B2 | 11/2006 | Storm | |
| 7,181,982 B2 | 2/2007 | Christian et al. | |
| 7,258,025 B2 | 8/2007 | Doihara et al. | |
| 7,343,822 B2* | 3/2008 | Kolahi | G01F 1/8404 73/861.357 |
| 7,861,603 B2 | 1/2011 | Takayanagi | |
| 9,046,401 B2 | 6/2015 | Henry et al. | |
| 9,354,096 B2* | 5/2016 | Mouler | G01F 1/8422 |

(Continued)

OTHER PUBLICATIONS

Storm, Ralf, et al.; "Model-based correction of Coriolis mass flowmeters", IEEE Transactions on Instrumentation and Measurement, vol. 51, Issue: 4, pp. 605-610, Aug. 2002.

(Continued)

*Primary Examiner* — Harshad R Patel
(74) *Attorney, Agent, or Firm* — Arent Fox, LLP

(57) ABSTRACT

A system that includes a flow tube configured to provide a flow path through the flow tube. The system also includes a plurality of actuators distributed radially about the flow tube, wherein a first actuator of the plurality of actuators is configured to drive a first oscillation in a first plane and a second actuator of the plurality of actuators is configured to drive a second oscillation in a second plane. Further, the system includes a plurality of sensor sets disposed on the flow tube, wherein each sensor set comprises two or more sensors configured to sense the first oscillation, the second oscillation, or both.

16 Claims, 8 Drawing Sheets

(56) References Cited

U.S. PATENT DOCUMENTS

| | | | | |
|---|---|---|---|---|
| 2003/0089180 A1* | 5/2003 | Amabili | ................ | G01F 1/8463 |
| | | | | 73/861.357 |
| 2005/0268731 A1* | 12/2005 | Hussain | ................ | G01F 1/8413 |
| | | | | 73/861.357 |
| 2006/0173639 A1 | 8/2006 | Carpenter | | |
| 2009/0039752 A1* | 2/2009 | Rooymans | ............. | A01G 7/045 |
| | | | | 313/36 |
| 2012/0269686 A1* | 10/2012 | Jung | ...................... | B01J 8/1818 |
| | | | | 422/139 |
| 2014/0311255 A1* | 10/2014 | Mouler | ................. | G01F 1/8422 |
| | | | | 73/861.357 |
| 2016/0178447 A1* | 6/2016 | Ito | ........................... | G01K 7/02 |
| | | | | 374/179 |
| 2016/0187176 A1 | 6/2016 | Cage et al. | | |
| 2017/0241823 A1 | 8/2017 | Kolahi et al. | | |

OTHER PUBLICATIONS

Anklin, Martin, et al.; "Coriolis mass flowmeters: Overview of the current state of the art and latest research", Flow Measurement and Instrumentation, vol. 17, Issue: 6, pp. 317-323, Dec. 2006.

Elsaesser, Derek; "Sensor data fusion using a probability density grid", 2007 10th International Conference on Information Fusion, pp. 1-8, Jul. 9-12, 2007.

Enz, Stephanie; "Effect of asymmetric actuator and detector position on Coriolis flowmeter and measured phase shift", Flow Measurement and Instrumentation, vol. 21, Issue: 4, pp. 497-503, Dec. 2010.

International Search Report and Written Opinion corresponding to International Application No. PCT/EP2019/060109, dated Jun. 28, 2019.

* cited by examiner

CORIOLIS FLOW METER WITH MULTIPLE ACTUATORS ARRANGED ON A FLOW TUBE AND DRIVEN IN DIFFERENT PLANES

BACKGROUND

The present disclosure generally relates to Coriolis flow sensors. More specifically, the present disclosure relates to a Coriolis flow sensor assembly having multiple actuators that each drive an oscillation and, in certain embodiments, the assembly may include a flow tube shell to improve the accuracy of measurements performed by the Coriolis flow sensor.

Accurate measurements of the properties of fluids delivered through flow systems is important for a variety of applications, such as in bioprocessing systems and oil and gas pipelines. One technique for measuring the properties of fluids is by using the flow rate. This permits measurements to be performed during fluid delivery or flow, which is advantageous for reducing associated operating costs. That is, active flow systems may be operational during measurement. Flow rates may be measured either as volumetric flow rates or mass flow rates. Volumetric flow rates are accurate if the density of the fluid is constant; however, this is not always the case as the density may change significantly with temperature, pressure, or composition. As such, mass flow rates are typically more reliable for measuring fluid flow. One method for measuring mass flow rates is through a Coriolis flow sensor (e.g., a flow meter). In general, a Coriolis flow sensor measures mass flow rates via the Coriolis force that results from the fluid as it moves through an oscillating tube.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible embodiments. Indeed, the disclosure may encompass a variety of forms that may be similar to or different from the embodiments set forth below. Provided herein is a system having a flow tube configured to provide a flow path through the flow tube. The system also includes a plurality of actuators distributed radially about the flow tube, wherein a first actuator of the plurality of actuators is configured to drive a first oscillation in a first plane and a second actuator of the plurality of actuators is configured to drive a second oscillation in a second plane. Further, the system includes a plurality of sensor sets disposed on the flow tube, wherein each sensor set comprises two or more sensors configured to sense the first oscillation, the second oscillation, or both.

Provided herein is a method that includes actuating a flow tube with a first actuator to cause the flow tube to oscillate in a first plane, the flow tube having a fluid flowing along a flow path. The method also includes measuring a first oscillation of the flow tube in the first plane. Then, the method includes actuating the flow tube with a second actuator to cause the flow tube to oscillate in a second plane. Further, the method includes measuring a second oscillation of the flow tube in the second plane. Further still, the method includes determining a property of the fluid based on the measured first oscillation and measured second oscillation.

Provided herein is a system having a fluid flow assembly, the fluid flow assembly comprising a primary tube and a secondary tube, wherein the fluid flow assembly is configured to provide a flow path through the primary tube, wherein the primary flow tube is generally straight along the flow path, and wherein the secondary tube is coaxial with the primary tube and forms a gap with the primary tube. The system also includes a plurality of actuators distributed radially about the flow tube, wherein a first actuator of the plurality of actuators is configured to drive a first oscillation in a first plane and a second actuator of the plurality of actuators is configured to drive a second oscillation in a second plane. Further, the system includes a plurality of sensors disposed within the secondary tube and configured to sense one or both of the first oscillation or the second oscillation.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
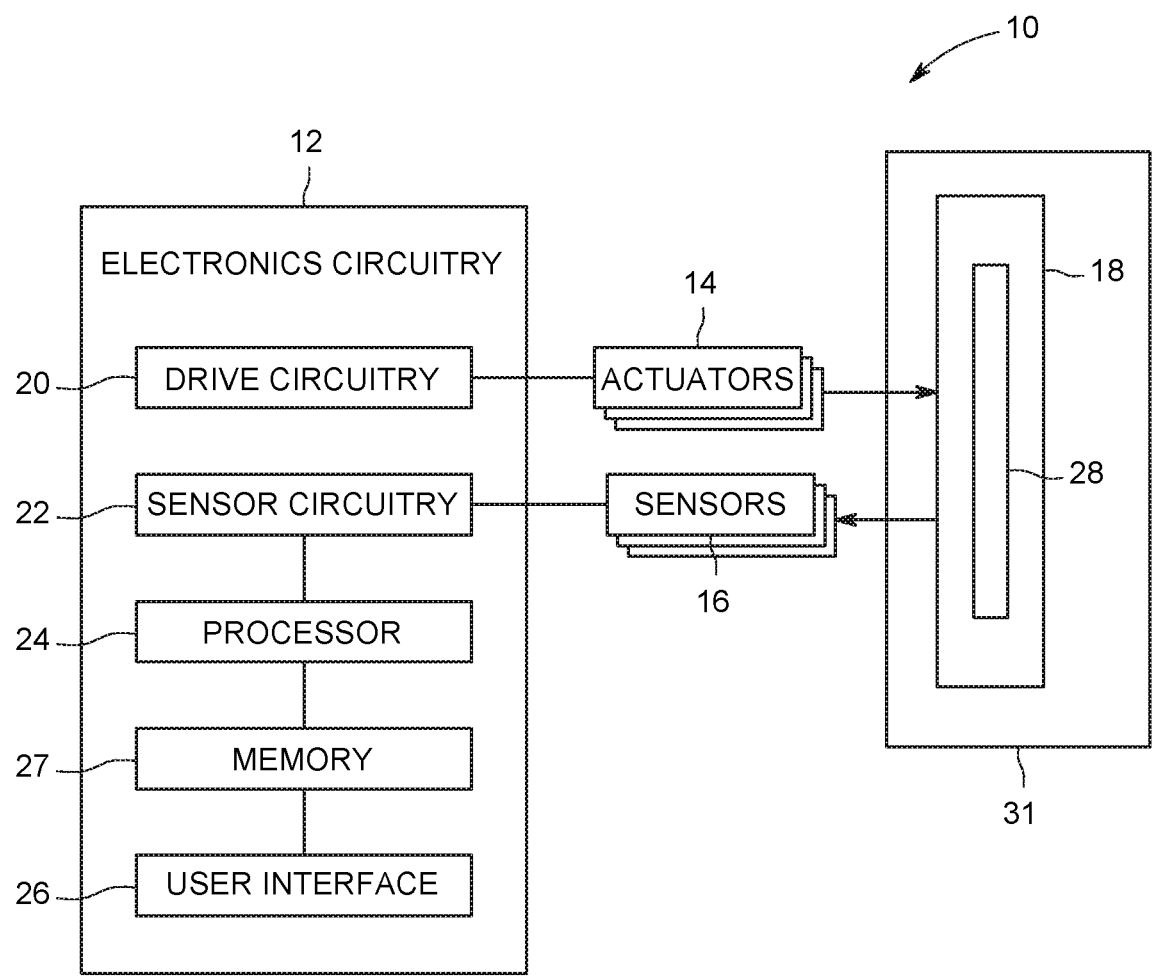
FIG. 1 is a block diagram of a Coriolis flow sensor system in accordance with the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Coriolis flow sensors are useful in numerous applications that involve fluid flow, such as bioprocessing systems. In general, a Coriolis flow sensor operates by measuring a phase shift of one or more oscillating flow tubes that results from a Coriolis force caused by the fluid flowing inside of the tube. It is beneficial to provide a Coriolis flow sensor design that increases the effect of the Coriolis force, which in turn results in an increased mass flow sensitivity and sensing amplitude (e.g., high signal to noise ratio). That is, the arrangement and the structural characteristics of the components of the sensor assembly as provided herein may influence the sensitivity of the measurements.

Many approaches to modifying the geometric form of the tubing often result in large tubing loops that have no advantage in zero point stability because external disturbances are also magnified (which in turn decrease sensor accuracy). Additionally, many approaches for Coriolis flow sensors designed for high pressure fluid flow may use more rigid material or increase the wall thickness of the pipes, which results in a lower sensitivity of the Coriolis flow sensors. The relationship between the structure of the flow tube and an operating pressure of the fluid flowing through the flow tube is shown by Barlow's formula:

$$t = \frac{P * D}{2 * S}$$

with t being wall thickness, P is the relative pressure between the inside and the outside of the flow tube, S being the allowable stress (e.g., suitable operating pressure of the flow tube), and D being outer diameter of the flow tube. As the wall thickness increases, the bending stiffness of the flow tube increases, which reduces down the oscillation amplitude that drives the Coriolis effect, which in turn decreases the sensitivity of the sensor and increases the signal to noise ratio. Further, these configurations also take up additional space in a fluid flow system, and the looped geometric form modifies the fluid flow path, which influence pressure loss, flow velocity, shear rate, trappings, draining, and abrasion.

The present disclosure is directed to a Coriolis flow sensor assembly with improved sensitivity and a low signal to noise ratio. The assembly may include a flow tube (e.g., a disposable flow tube), multiple actuators, and multiple sets of sensors. Each actuator drives an oscillation of the flow tube within a respective plane, and each set of sensors is configured to measure the phase shift resulting from the oscillation and the Coriolis force in a given plane. Measuring oscillations in multiple different planes/dimensions may increase the certainty of measurements.

Turning now to the figures, FIG. 1 is a diagram illustrating an embodiment of the Coriolis flow sensor system 10. The Coriolis flow sensor system 10 includes electronics circuitry 12 coupled to one or more actuators 14 and one or more sensors 16. The one or more actuators 14 and the sensors 16 are coupled to the flow tube 18.

The electronics circuitry 12 includes drive circuitry 20 to trigger the one or more actuator(s) 16 to generate oscillations in the flow tube 18 of the desired frequency and magnitude. The Coriolis flow sensor system 10 further includes sensor circuitry 22 to receive the Coriolis response from the flow tube 18. The electronics circuitry 12 further includes a processor 24 to process the Coriolis response signals received from the sensors 16 to generate one or more measurements representative of one or more properties of the fluid. These measurements are displayed via a user interface 26. The electronics circuitry 12 also includes a memory 27 to store the measurements for further use and communication, to store data useful for the drive circuitry 20, and the sensor circuitry 22.

In operation, a flow of a fluid 28 is provided to the flow tube 18. The electronics circuitry 12 triggers the one or more actuator(s) 14 to generate oscillations in the flow tube 18, which are transferred to the fluid 28. The one or more actuators 14 are used to induce oscillations of an appropriate amplitude over a required frequency range in the fluid 28. Due to these oscillations and the flow of the fluid 28 through the flow tube 18, the Coriolis response (vibration amplitude and phase) is generated in the fluid and is sensed by the sensors 16 through the flow tube 18. The sensed Coriolis response signal from the sensors 16 are transmitted to the electronics circuitry 12 for further processing to obtain the measurements of the one or more properties of the fluid including fluid flow. The one or more sensors 16 are configured to provide signals indicative of a Coriolis response caused by the fluid 28 flowing through the flow tube 18. The one or more sensors 16 may include, for example, electromagnetic sensors, or optical sensors, and associated components. Further, the sensors 16 may include separating sensing components, with a portion of the sensor 16 being disposed on the flow tube 18 and a portion of the sensor 16 being spaced apart from the flow tube 18, and whereby the sensor 16 is configured to measure a change in physical distance between the components as a measure of the oscillation of the flow tube 18.

The system 10 may be used to assess fluid characteristics in any fluid flow system. As disclosed, the fluid characteristics may be assessed during operation of a variety of manufacturing and/or fluid flow processes. Some applications for the system 10 described herein include fabrication of wafers in semi-conductor industry, and medical applications that involve use of organic fluids. Some of these are high purity applications, and use of flow tube 18 made of for example polymer, or other chemically inert material is advantageous in such applications. In some other applications, a flow tube 18 formed of electrically inert and low thermal conductivity material like glass is advantageous.

It would be appreciated by those skilled in the art that one or more components of the Coriolis flow sensor system may be configured as disposable parts, and that other components may be configured as re-usable resident parts. To that end, in implementations in which certain components are disposable, the disposable components may be separable (e.g., by an operator using appropriate tools or by hand) from the resident parts. For example, at least one of the flow tubes 18, the one or more actuators 14, or the one or more sensors 16 may be disposable parts, and other parts are configured as reusable resident parts. It would be appreciated by those skilled in the art that the disposable part(s) may be replaced at very low cost in intervals governed by the specific process needs. In addition, in some implementations, the flow tube 18 may be changed), without the need for replacement of the entire Coriolis flow sensor. The disposable-part sub-system allows obtaining high accuracy measurements, reusing of part of the Coriolis flow sensor system 10, provides a flexibility for single-use applications, and achieves cost and material savings.

The flow tube 18 may be configured as a conduit with an internal passage that permits fluid flow and may be formed in a shape including, but not limited to single, dual or multi loop configurations, split flow, straight tube, counter- or co-flow configurations. In some implementations, the flow tube 18 is made from, for example, a polymer whose influence on the oscillation modes (harmonic frequencies) of the mechanical oscillator is not dominant. In some other examples, the flow tube 18 is made of metal. In yet other examples, the flow tube 18 is made of glass. The flow tube material, in some examples, is tailored to specific requirements of the bioprocessing application, such as temperature, pressure, and the characteristics of the fluid to be measured (e.g., corrosivity). Further, the flow tube 18 may be implemented with wall thickness or material features to promote the variable stiffness along its length as provided herein. The flow tube 18 may be arranged to permit in-line fluid flow sensing for a fluid processing system. Accordingly, the flow tube may be in fluid communication with fluid conduits of a larger fluid processing system.

In some embodiments, the flow tube 18 may include additional structural features that may stabilize and improve the performance of the flow tube 18. As such, the flow tube 18 and any additional structural features may be referred to collectively as the fluid flow assembly 31. For example, the fluid flow assembly 31 may include a base or housing configured to accommodate the flow tube 18, the actuators 14, and/or the sensors 16. In addition, in embodiments in which the flow tube 18 is disposable, the fluid flow assembly may include coupling points to which ends of the flow tube 18 may be attached and that fluidically couple the flow tube 18 to the fluid flow system 10 to permit in-line fluid flow. Further, while the depicted embodiments are in the context of a straight flow tube 18, the fluid flow assembly 31 may also accommodate a bent or looped flow tube 18.

Figure 2:
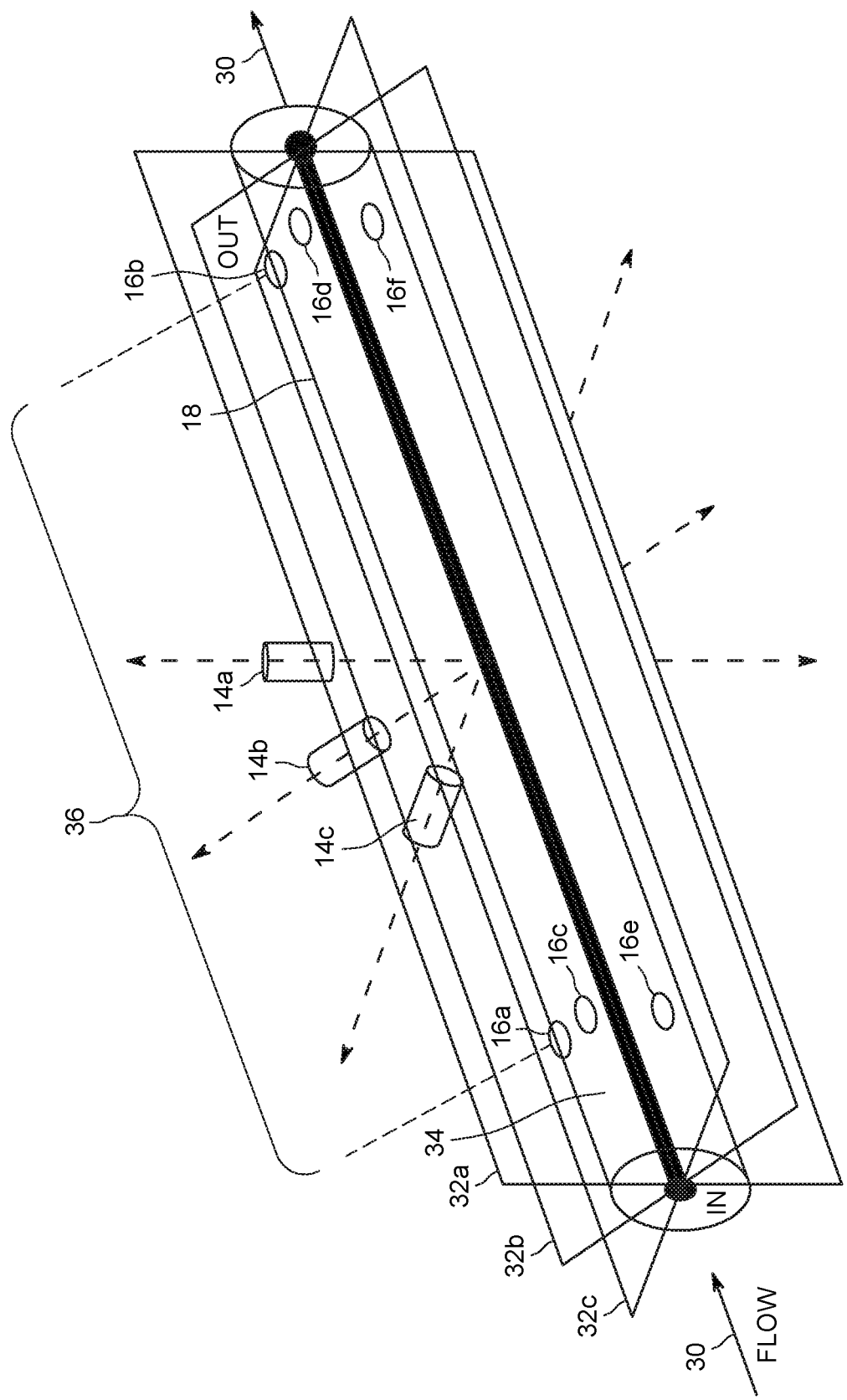
FIG. 2 is an illustration of a flow tube of a Coriolis flow sensor assembly having multiple sensors and multiple actuators, in accordance with the present disclosure.

FIG. 2 shows a flow tube 18 coupled to multiple actuators 14 and multiple sensors 16. As discussed herein, the flow tube 18 provides a flow path 30, or flow axis (e.g., in the direction illustrated by the arrow). In general, the actuators 14 drive an oscillation of the flow tube 18 in a respective plane 32, and when fluid 28 is flowing through the flow tube 18 along the flow path 30, a Coriolis effect is observed. The sensors 16 detect a phase difference in the oscillation of the flow tube 18, which will be discussed in more detail below.

As illustrated, the flow tube 18 includes six actuators 14a, 14b, 14c, 14d, 14e, and 14f. Each actuator 14 is disposed on or near the flow tube 18, and drives an oscillation in at least one plane 32. For example, the actuator 14a, in operation, drives an oscillation of the flow tube 18 in the plane 32a. It should be understood that oscillation of the flow tube 18 by the actuator/s 14 may primarily occur along a single plane but may also be detectable in other planes, depending on the nature of the oscillation.

Another actuator 14b is radially offset from the actuator 14a (e.g., approximately 45 degrees) and may drive an oscillation in the plane 32b. Further, another actuator 14c is radially offset from the actuator 14b and 14a (e.g., approximately 45 and 90 degrees, respectively). As such, the actuator 14c may drive an oscillation of the flow tube in a third plane 32c. It should be understood that the fluid flow assembly may include fewer or more actuators 14 and fewer or more sensors 16 than in the illustrated embodiment.

While each actuator 14 is discussed as being radially offset in increments of 45 degrees, the radial offset may be any suitable amount. Moreover, while each actuator 14 is positioned relatively in the center of the flow tube 18 relative to the flow axis 30, it would be appreciated by one of ordinary skill in the art that position of the actuators 14 may depend on the physical properties of the flow tube 18 as well as the type of oscillations (e.g., order of the mode). While only one actuator 14 is illustrated for each respective plane, in some embodiments, two actuators 14 may drive an oscillation in the same plane 32.

As illustrated, the flow tube 18 includes six sensors 16a, 16b, 16c, 16d, 16e, and 16f that are disposed on an outer surface 34 of the flow tube 18. As shown, sensors 16a and 16b are disposed within the plane 32a (e.g., are coplanar), sensors 16c and 16d are disposed within the plane 32b, and sensors 16e and 16f are disposed within the plane 32c. In general, each sensor 16 within a plane 32 will sense the Coriolis phase shift that results from the fluid flowing along the flow path 30 and oscillation driven by the one or more actuators 14. For example, upon the oscillator 14a driving an oscillation of the flow tube 18 along the plane 32a and fluid flowing along the flow path 30, there will be phase shift in the oscillation due to the Coriolis effect. Detection of the oscillation may involve a comparison of the flow tube oscillation between two or more spaced apart sensors 16, which may be referred to as a sensor set 36. The sensor set 36 may include sensors that a spaced apart along the length of the flow tube 18 (e.g., along the axis 30) and/or that are circumferentially spaced apart.

Figure 3:
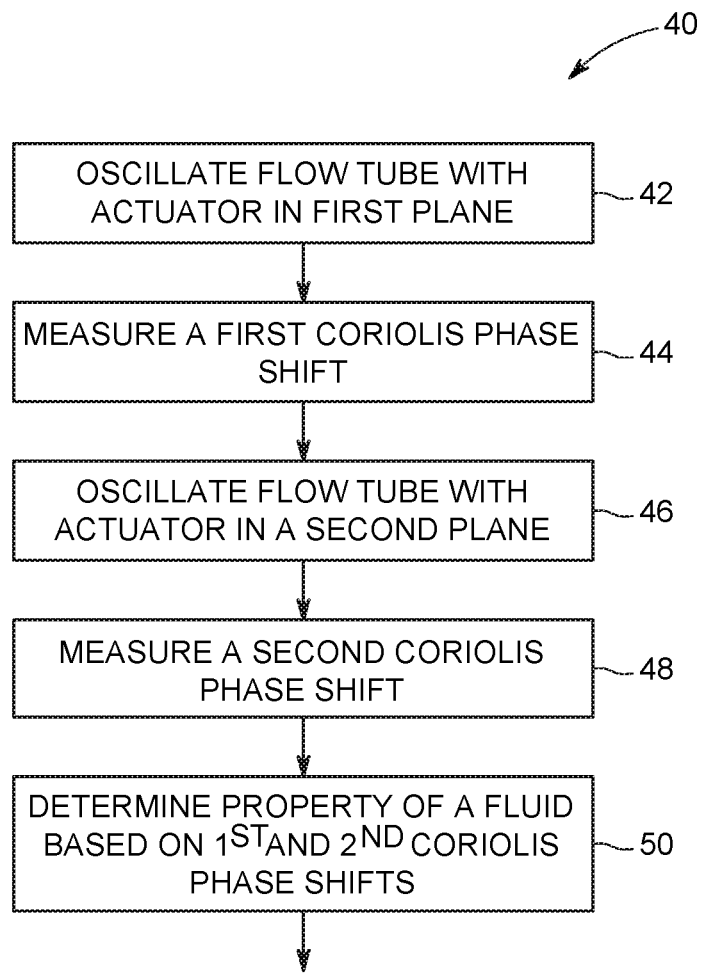
FIG. 3 shows a flow chart of a method for operating a Coriolis flow sensor, in accordance with the present disclosure.

In general operation, each actuator 14 may drive an oscillation of the flow tube 18 in any order (e.g., sequentially, in combination, etc.) deemed suitable for obtaining the highest signal to noise ratio. FIG. 3 is a flow chart illustrating an embodiment of the process 40 for operating the Coriolis flow sensor system 10, in accordance with the present disclosure. It is to be understood that the steps discussed herein are merely exemplary and certain steps may be omitted or performed in a different order than the order described below. In some embodiments, the process 40 may be stored on the non-volatile memory 27 and executed by the processor 24 of the electronics circuitry 12, or stored in other suitable memory and executed by other suitable processing circuitry associated with the Coriolis flow sensor system 10 or separate, suitable processing circuitry.

As shown in the illustrated embodiment of FIG. 3 at block 42, the processor 24 sends signals (e.g., drive signals) that cause an actuator 14 to oscillate the flow tube 18 in a manner that is detectable in a first plane 32. For example, the actuator 14a may drive an oscillation of the flow tube 18 in the plane 32a. When fluid 28 is flowing through the flow tube 18, a Coriolis phase effect occurs that induces a phase shift along the oscillating flow tube 18. Then, at block 44, the processor 24 measures a first Coriolis phase shift associated with the oscillation in the first plane 32 (e.g., plane 32a). That is, the sensors 16 are configured to measure the phase shift in the first plane 32 and may measure signals or data that is indicative of a property of the fluid flowing through the flow tube 18. Changes in the Coriolis phase effect over time may indicate changes in the characteristics of the fluid, At block 46, the processor 24 sends suitable signals that cause an actuator 14 to oscillate the flow tube 18 in a second plane 32. For example, the actuator 14b may drive an oscillation of the flow tube 18 in the plane 32b. When fluid 28 is flowing through the flow tube 18, a Coriolis phase effect occurs that induces a phase shift along the oscillating flow tube 18. Then, at block 48, the processor 24 measures a first Coriolis phase shift associated with the oscillation in the second plane 32 (e.g., plane 32b). That is, the sensors 16 that are configured to measure the phase shift in the first plane 32, may measure signals or data that is indicative of a property of the fluid.

At block 50, the processor 24 determines a property of the fluid based on the Coriolis phase shifts that resulted from the oscillation in the first and second planes 32 (e.g., 32a and 32b). In some embodiments, the processor 24 may send suitable signals that cause a third actuator 14 (e.g., actuator 14c) to drive an oscillation in a third plane 32c, before reaching block 50. Further, the oscillations in flow tube referred to in blocks 42 and 46 may be at a respective first and second frequency. Even further, the oscillations may be in the same plane 32, but have different frequencies.

As such, one embodiment of the present disclosure is directed to a Coriolis flow sensor assembly with improved sensitivity and low signal to noise ratio. The assembly may include a flow tube (e.g., a disposable flow tube), multiple actuators, and multiple sets of sensors. Each actuator is configured to drive an oscillation of the flow tube within a plane, and each set of sensors is configured to measure the phase shift resulting from the oscillation and the Coriolis force in a given plane.

In another embodiment, the present disclosure is directed to a flow tube with a flow tube shell that reduce loss of oscillation forces. In an embodiment, a Coriolis flow sensor system may include a flow tube shell that surrounds the flow tube. The flow tube shell includes a pressurized volume or gap in between the flow tube and the flow tube shell that may act as a pressure containment and barrier for the flow tube. That is, the pressurized gap reduces the relative pressure, P, as shown in Barlow's formula discussed herein. Further, the pressurized gap may minimize unwanted oscillations, such as oscillations in directions other than the oscillation in the direction driven by the actuator. Unwanted oscillations interfere with the performance and reduce the SNR of the Coriolis flow sensor. For example, the interference can create a phase shift signal not created by the mass flow that also oscillations and result in large data scatter and hysteresis. The flow tube shell may also reduce many structural modifications that are performed to improve the performance of the Coriolis flow sensor, such as looped configurations that introduce dead, or unused, volume. Further, the present techniques may facilitate thinner walls of the flow tube or permitting less rigidity in the flow tube, which lead to increased sensitivity and SNR.

Figure 4:
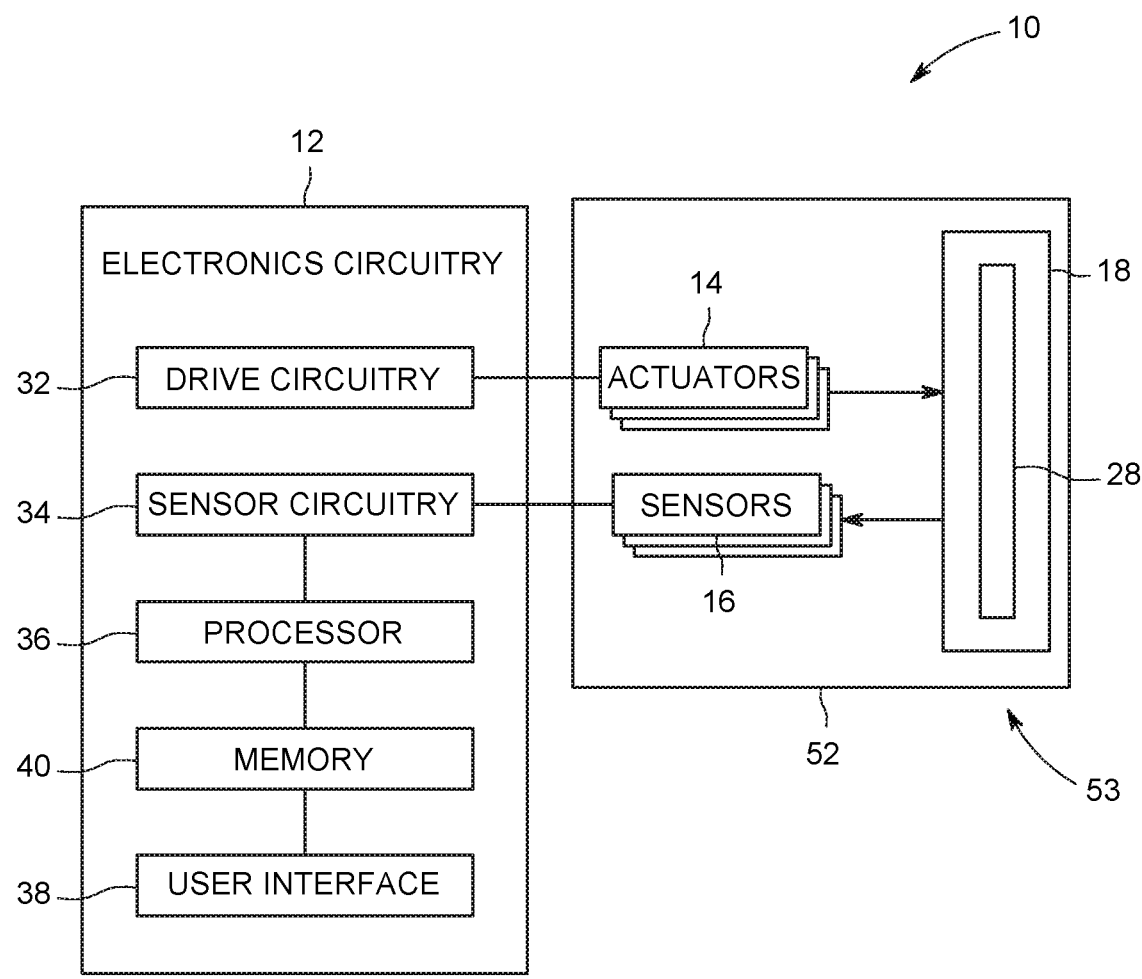
FIG. 4 is a block diagram of a Coriolis flow sensor system in accordance with the present disclosure.

FIG. 4 is a diagram illustrating an embodiment of the Coriolis flow sensor system 10. The Coriolis flow sensor system 10 includes electronics circuitry 12 coupled to one or more actuators 14 and one or more sensors 16. The one or more actuators 14 and the sensors 16 are coupled to the flow tube 18. The flow tube 18 is enclosed within a flow tube shell 52 that also houses the actuators 14 and sensors 16 to form a Coriolis flow sensor assembly 53.

The electronics circuitry 12 includes drive circuitry 20 to trigger the one or more actuator(s) 16 to generate oscillations in the flow tube 18 of the desired frequency and magnitude. The Coriolis flow sensor system 10 further includes sensor circuitry 22 to receive the Coriolis response from the flow tube 18. The electronics circuitry 12 further includes a processor 24 to process the Coriolis response signals received from the sensors 16 to generate one or more measurements representative of one or more properties of the fluid. These measurements are displayed via a user interface 26. The electronics circuitry 12 also includes a memory 27 to store the measurements for further use and communication, to store data useful for the drive circuitry 20, and the sensor circuitry 22.

In operation, a flow of a fluid 28 is provided to the flow tube 18. The electronics circuitry 12 triggers the one or more actuator(s) 14 to generate oscillations in the flow tube 18, which are transferred to the fluid 28. The oscillations in the flow tube 18 are relative to the flow tube shell 52, which essentially remains still. The one or more actuators 14 are used to induce oscillations of an appropriate amplitude over a required frequency range in the fluid 28. The flow tube shell 52 is pressurized either with liquid or gas, and generally prevents oscillations of the flow tube 18 in directions or planes other than an intended direction of the oscillation. That is, certain frequencies of the oscillation modes of the flow tube 18 may have partial overlap, and these other frequencies may reduce the amplitude of the intended oscillation. As such, the oscillation induced (e.g., driven) by the actuators 14 may partially excite unwanted modes. As discussed in more detail below, the pressurized flow tube shell 52 reduces or prevents the unwanted oscillations, which may reduce the SNR of the intended oscillation.

Due to these oscillations and the flow of the fluid 28 through the flow tube 18, the Coriolis response (vibration amplitude and phase) is generated in the fluid and is sensed by the sensors 16 through the flow tube 18. The sensed Coriolis response signal from the sensors 16 are transmitted to the electronics circuitry 12 for further processing to obtain the measurements of the one or more properties of the fluid including fluid flow. The one or more sensors 16 are configured to provide signals indicative of a Coriolis response caused by the fluid 28 flowing through the flow tube 18. The one or more sensors 16 may include, for example, electromagnetic sensors, or optical sensors, and associated components.

The system 10 may be used to assess fluid characteristics in any fluid flow system. As disclosed, the fluid characteristics may be assessed during operation of a variety of manufacturing and/or fluid flow processes. Some applications for the system 10 described herein include fabrication of wafers in semi-conductor industry, and medical applications that involve use of organic fluids. Some of these are high purity applications, and use of flow tube 18 made of for example polymer, or other chemically inert material is advantageous in such applications. In some other applications, a flow tube 18 formed of electrically inert and low thermal conductivity material like glass is advantageous.

It would be appreciated by those skilled in the art that one or more components of the sensor assembly 14 may be configured as disposable parts, and that other components may be configured as re-usable resident parts. To that end, in implementations in which certain components are disposable, the disposable components may be separable (e.g., by an operator using appropriate tools or by hand) from the resident parts. For example, at least one of the flow tubes 18, the one or more actuators 14, or the one or more sensors 16 may be disposable parts, and other parts are configured as reusable resident parts. It would be appreciated by those skilled in the art that the disposable part(s) may be replaced at very low cost in intervals governed by the specific process needs. In addition, in some implementations, the flow tube 18 may be changed), without the need for replacement of the entire Coriolis flow sensor. The disposable-part sub-system allows obtaining high accuracy measurements, reusing of part of the Coriolis flow sensor system 10, provides a flexibility for single-use applications, and achieves cost and material savings.

As discussed herein, the flow tube 18 may be configured as a conduit with an internal passage that permits fluid flow and may be formed in a shape including, but not limited to single, dual or multi loop configurations, split flow, straight tube, counter- or co-flow configurations. In some implementations, the flow tube 18 is made from, for example, a polymer whose influence on the oscillation modes (harmonic frequencies) of the mechanical oscillator is not dominant. In some other examples, the flow tube 18 is made of metal. In yet other examples, the flow tube 18 is made of glass. The flow tube material, in some examples, is tailored to specific requirements of the bioprocessing application, such as temperature, pressure, and the characteristics of the fluid to be measured (e.g., corrosivity). Further, the flow tube 18 may be implemented with wall thickness or material features to promote the variable stiffness along its length as provided herein. The flow tube 18 may be arranged to permit in-line fluid flow sensing for a fluid processing system. Accordingly, the flow tube may be in fluid communication with fluid conduits of a larger fluid processing system.

Figure 5:
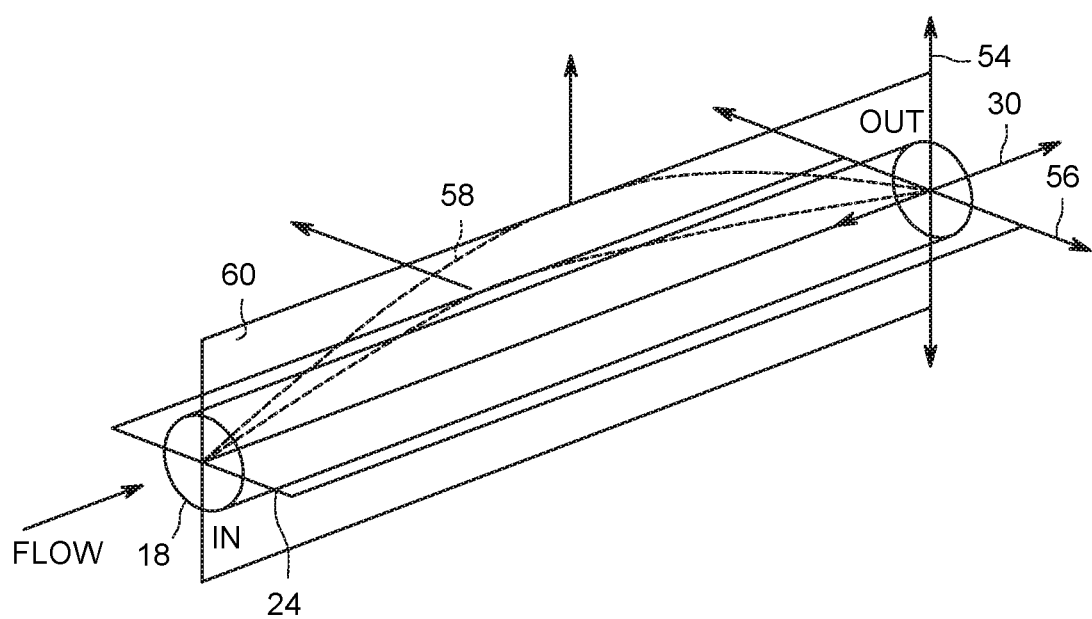
FIG. 5 is an illustration of various axes of oscillations of a flow tube of a Coriolis flow sensor, in accordance with the present disclosure.

As discussed above, the flow tube shell 52, shown in FIG. 4, generally reduces the effect of unwanted oscillations. FIG. 5 is a schematic illustration of a vertical axis 54 and a lateral axis 56 along a flow tube 18. As shown, the oscillation 58 occurs in a plane 60 spanning the vertical axis 54 and the flow axis 30. Unwanted harmonic modes (e.g., structural modes) may occur along the axes 54 and 56 and contribute to the Coriolis deflection shape that may reduce the amplitude of the oscillation 58. In order to damp or shift the frequency of unwanted harmonic modes of the flow tube 18, additional structural features may be added. Structural features along certain axes (e.g., 54 and 56) may provide independent influence on the different vibration modes with a variable cross section that adjusts (e.g., shift the frequency of the harmonic mode up, shift the frequency down, or decrease the amplitude) the unwanted harmonic modes until the effect of the unwanted harmonic modes is negligibly, resulting in increased sensitivity and robustness of the Coriolis flow sensor assembly. The features that alter the unwanted harmonic modes (e.g., modal features) may have various designs, structures, and properties to address different modes.

Figure 6:
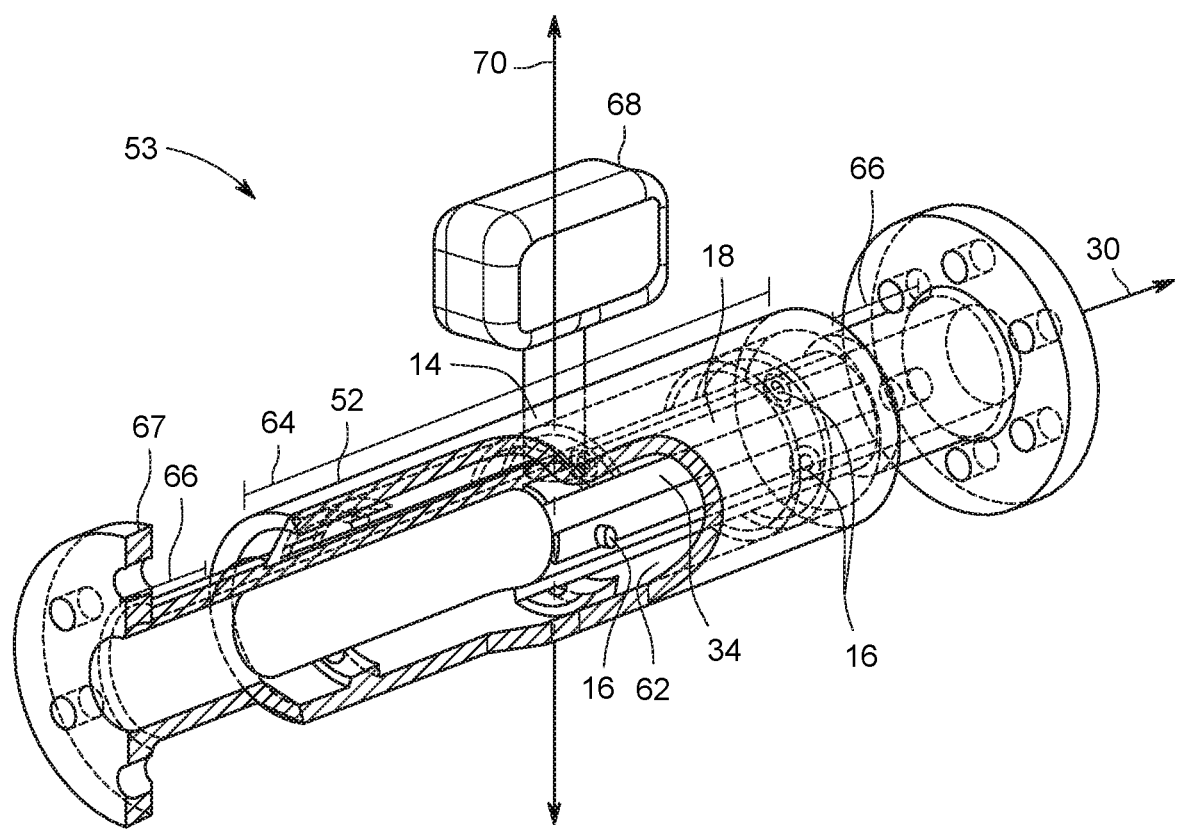
FIG. 6 is an illustration of a flow tube and a flow tube shell of a Coriolis flow sensor assembly, in accordance with the present disclosure.

FIG. 6 is a partial cutaway view of a Coriolis flow sensor assembly 53 that includes flow tube 18 (e.g., a primary tube) and a flow tube shell 52 (e.g., secondary tube) of the Coriolis flow sensor system 10. The flow tube includes a plurality of sensors 16 that are disposed on the outer surface 34 of the flow tube and may operate as described herein. As illustrated the flow tube shell 52 is coaxial (e.g., about the flow path 30 with the flow tube 18. Further, the flow tube shell 52 surrounds the flow tube 18 such that a gap 62 is formed between the flow tube shell 52 and the flow tube 18. As discussed herein, the gap 62 may be pressurized with a fluid (e.g., a liquid or gas).

As shown, the gap 62 generally surrounds a portion 64 of the flow tube 18 along the flow path 30. In general, portion 64 surrounded by the gap 62 would have a suitable length (e.g., 20%, 40%, 60%, 80%, less than 100% of the total length of the tube) of a portion 64 of the flow tube 18 where the flow tube 18 may oscillate under operation. In one embodiment, the flow tube shell 52 is in contact with (e.g., attached to) the ends 66 of the flow tube 18 or couples to a coupling joint 67 coupling the flow tube 18 to the system 10, and connection between the flow tube 18 and the flow tube shell 52 at the ends 66 may maintain the pressure within the gap 62. The flow tube 18 may be composed of a more flexible material than the flow tube shell 52. In certain embodiments, the flow tube assembly 53 may be separable from the system 10 and may be provided as a unitary assembly.

As shown, a transmitter 68 is generally aligned on a central axis 70 of the flow tube 18 and the flow tube shell 52. The transmitter 68 sends signals to the actuator 14 that drives an oscillation of the flow tube at a frequency, as discussed herein. Additionally, the transmitter 68 may receive signals from the sensors 16. Further, the transmitter 68 may include circuitry for managing (e.g., sending signals) to the sensor(s) 16 and the actuator(s) 14. Further still, the transmitter 68 may provide an interface to the user, either through a visual display or on an electronic interface (e.g., RS-232).

As illustrated in FIG. 6, the actuator 14 is disposed near the center axis 70, it would be appreciated by one of ordinary skill in the art that the location of the actuator 14 may depend on the mode of the oscillation. For example, a suitable position for an actuator 14 may be some fraction along the portion 64 of the flow tube 18. Further, as discussed herein, the Coriolis flow system 10 may include multiple actuators 14 that each drive an oscillation at a frequency/location.

Figure 7:
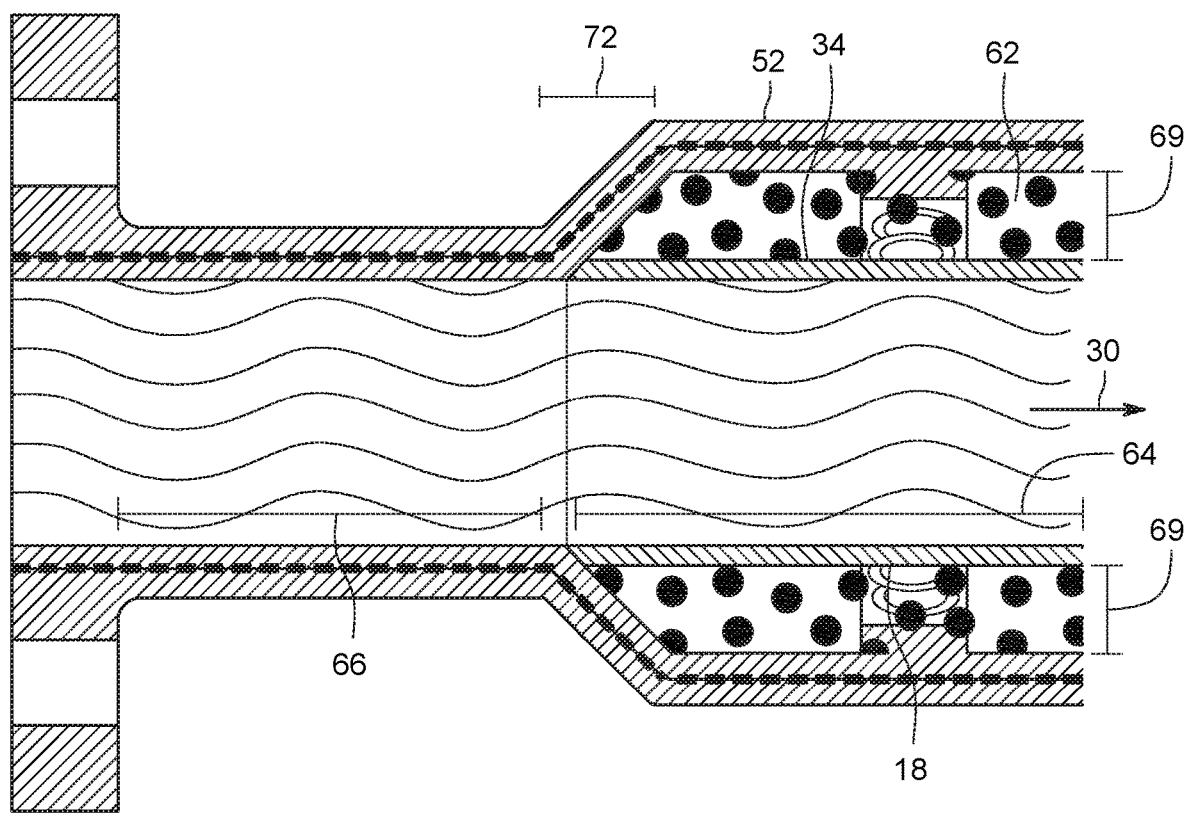
FIG. 7 shows a cross section of a flow tube and a flow tube shell of a Coriolis flow sensor assembly, in accordance with the present disclosure.

FIG. 7 shows a cross section along the flow path 30 of the flow tube 18 that is surrounded by the flow tube shell 52, as show in FIG. 6. As shown, the outer surface 34 of the flow tube 18 is in contact with the pressurized gap 62. The distance 69 between the outer surface 34 of the flow tube 18 and flow tube shell 52 may be any suitable distance 69 that does not restrict the oscillation(s) of the flow tube 18. FIG. 7 also shows a transition region 72 between one end 66 of the flow tube 18 and flow tube shell 52. The transition region 72 may have any suitable shape between the end 66 where the flow tube 18 is in contact with the flow tube shell 52 and the portion 64 having the gap 62.

As such, another embodiment of the present disclosure is directed to a Coriolis flow sensor system having a flow tube and a flow tube shell. In general, a pressurized gap between the flow tube and the flow tube shell reduces effects of unwanted oscillations. One or more actuators and one or more sensors may be disposed within the flow tube shell. The sensors may be disposed on the flow tube and the actuators may be disposed radially around the flow tube about the flow path.

Figure 8:
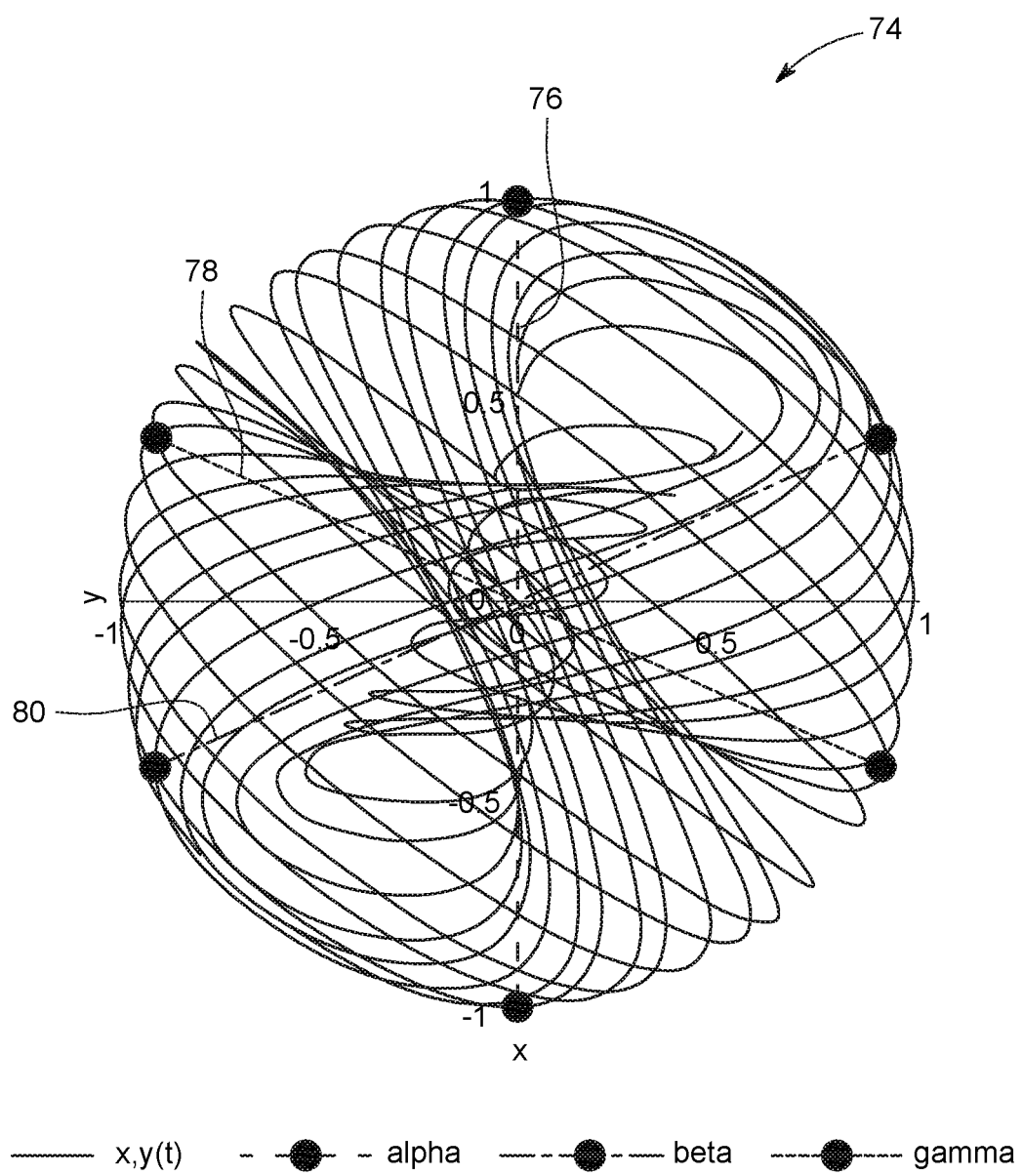
FIG. 8 shows a complex oscillation of a flow tube, in accordance with the present disclosure.

As discussed herein, the Coriolis flow sensor system 10 may include multiple actuators 14 and multiple sensors 16. As such, the multiple actuators 14 may drive multiple oscillations. In some embodiments, complex oscillations may be driven at various frequencies. FIG. 8 shows the oscillation position 74 (e.g., oscillation driven in the axes 54 and 56, shown in FIG. 5, as a function of time) with three different oscillation frequencies 76, 78, and 80. That is, the oscillation of the flow tube 18 may be a combination of multiple oscillations.

This written description uses examples, including the best mode, and also to enable any person skilled in the art to practice the embodiments of the disclosure, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
a flow tube configured to provide a flow path through the flow tube;
a plurality of actuators distributed radially about the flow tube, wherein a first actuator of the plurality of actuators is configured to drive a first oscillation in a first plane, a second actuator of the plurality of actuators is configured to drive a second oscillation in a second plane, and a third actuator of the plurality of actuators is configured to drive a third oscillation in a third plane, wherein a frequency of each oscillation driven by each actuator is different; and a plurality of sensor sets disposed on the flow tube, wherein each sensor set comprises two sensors configured to sense the first oscillation, the second oscillation, or the third oscillation.

2. The system of claim 1, wherein the second actuator is radially offset from the first actuator by about 45 degrees, and the third actuator is radially offset from the first actuator by about 90 degrees.

3. The system of claim 1, wherein the first actuator is disposed opposing a different actuator of the plurality actuators about the flow tube.

4. The system of claim 1, wherein each sensor set comprises a first sensor spaced apart from a second sensor along a length of the flow tube.

5. The system of claim 1, wherein the flow tube is at least partially surrounded by a pressurized flow tube shell that is coaxial with the flow tube.

6. The system of claim 1, wherein each oscillation is driven at a central portion of the flow tube.

7. A method comprising:
actuating a flow tube with a first actuator at a first frequency to cause the flow tube to oscillate in a first plane, the flow tube having a fluid flowing along a flow path;
measuring a first oscillation of the flow tube in the first plane;
actuating the flow tube with a second actuator at a second frequency to cause the flow tube to oscillate in a second plane;
measuring a second oscillation of the flow tube in the second plane; and
determining a property of the fluid based on the measured first oscillation and measured second oscillation;
actuating the flow tube with a third actuator at a third frequency to cause the flow tube to oscillate in a third plane; and
measuring a third oscillation of the flow tube in the third plane;
wherein, the first frequency, the second frequency and the third frequency of each oscillation driven by each actuator is different;
wherein determining the property of the fluid is based in part on the measured third oscillation.

8. The method of claim 7, wherein the first plane is radially offset from the second plane.

9. The method of claim 7, wherein determining the property of the fluid is based at least in part on an amplitude of the first oscillation and the second oscillation.

10. The method of claim 7, wherein first oscillation is at a different frequency relative to the second oscillation.

11. A system comprising:
a fluid flow assembly, the fluid flow assembly comprising a primary tube and a secondary tube, wherein the fluid flow assembly is configured to provide a flow path through the primary tube, wherein the primary flow tube is generally straight along the flow path, and wherein the secondary tube is coaxial with the primary tube and forms a gap with the primary tube;
a plurality of actuators distributed radially about the flow tube, wherein a first actuator of the plurality of actuators is configured to drive a first oscillation in a first plane, a second actuator of the plurality of actuators is configured to drive a second oscillation in a second plane, and a third actuator of the plurality of actuators is configured to drive a third oscillation in a third plane, wherein a frequency of each oscillation driven by each actuator is different; and
a plurality of sensors disposed within the secondary tube and configured to sense one of the first oscillation, the second oscillation, or the third oscillation.

12. The system of claim 11, wherein the plurality of sensors are disposed on the flow tube.

13. The system of claim 11, wherein the gap surrounds at least a portion of the primary tube along the flow path.

14. The system of claim 11, wherein the gap is pressurized with a gas.

15. The system of claim 11, wherein the gap is pressurized with a liquid.

16. The system of claim 11, wherein the primary tube has thinner walls or is less rigid than the secondary tube.

* * * * *